June 1, 1926.
J. C. GRIFFIN
1,586,988
BUMPER BRACKET CONSTRUCTION
Filed March 18, 1925
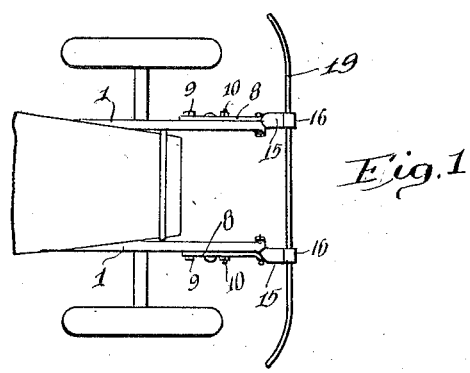
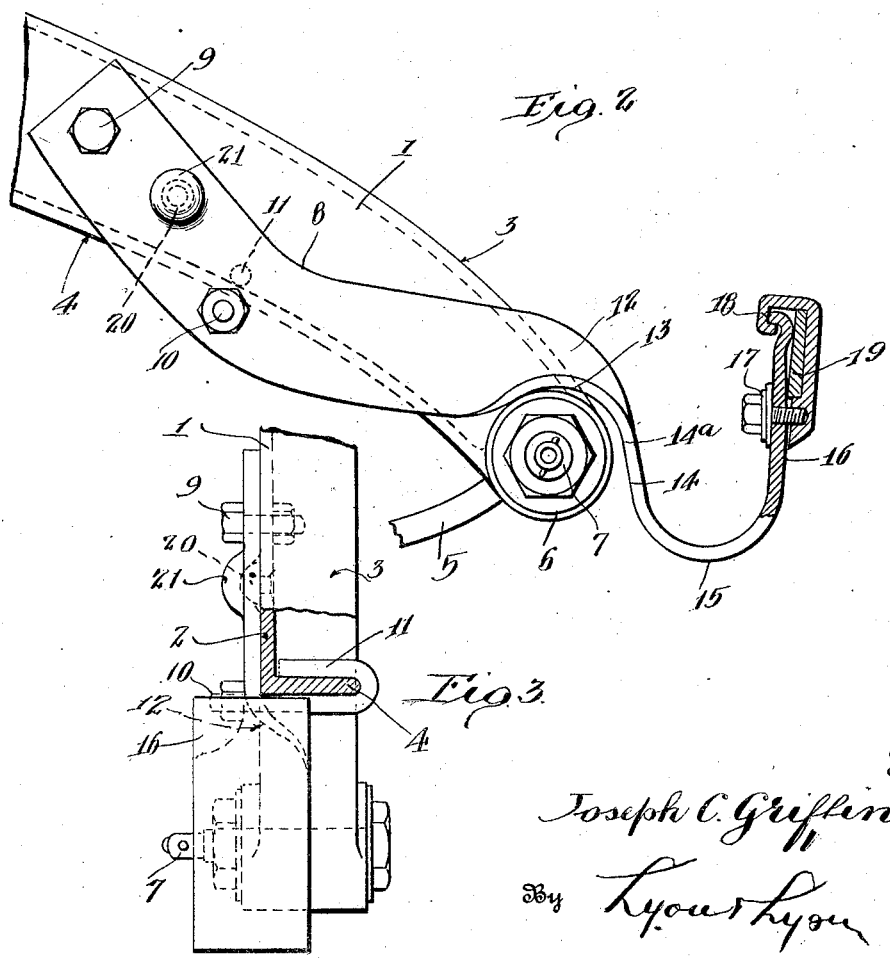
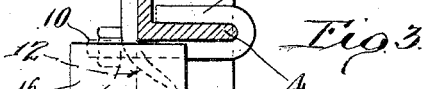
Inventor
Joseph C. Griffin
By Lyon & Lyon
Attorneys Patented June 1, 1926.

1,586,988

UNITED STATES PATENT OFFICE.

JOSEPH C. GRIFFIN, OF LOS ANGELES, CALIFORNIA.

BUMPER-BRACKET CONSTRUCTION.

Application filed March 18, 1925. Serial No. 16,420.

This invention relates to a bumper bracket construction for automobiles. This bumper bracket is of the type which is attached to the forward end of the frame for supporting the forward bumper bar. In attaching such a bracket, it is desirable to effect the attachment if possible without making any special bolt openings in the automobile frame. Recently, objection has been made to the attachment of such brackets on the upper side of the upper flange of the frame. However, nearly all automobile frames are provided with a bolt-hole in the web of the frame near the forward end for attachment of a "snubber." The general object of this invention is to provide a bumper bracket construction which enables a single bolt, for example, the snubber bolt of the frame, to be utilized to support the bracket in position, and to provide a construction for the bracket which will avoid the necessity of providing any additional bolt holes in the automobile frame; also to produce a bracket of simple construction which can be readily attached to the outer side of the web of the frame, but which is so constructed that it will extend over the shackle joint at the front end of the frame and present a spring bow or U forward of the frame to carry the bumper bar. More specifically stated, one of the features of the invention is a combined twist and bend which connects the rear portion of the bracket which is disposed in a vertical plane, with the spring bow of the bracket, the elements of which are disposed in a substantially horizontal plane.

Further objects of the invention will appear hereinafter.

The invention consists in the novel parts and combination of parts to be described hereinafter, all of which contribute to produce an efficient bumper bracket construction.

A preferred embodiment of the invention is described in the following specification, while the broad scope of the invention is pointed out in the appended claims.

In the drawings:

Fig. 1 is a plan of the forward portion of an automobile represented as carrying a bumper construction embodying my invention.

Fig. 2 is a side elevation showing the right hand bumper bracket together with a portion of the frame and spring, broken away, and also showing the forward portion of the bracket and the bumper bar in cross section.

Fig. 3 is a front elevation of the bracket construction shown in Fig. 2, shown partially in section and broken away.

The automobile to which I have represented the bumper bracket as applied is provided with the usual side frame bar of channel form having a vertical web with an upper flange and a lower flange. I provide a bracket with means for attaching it to the frame, such as a bolt adjacent its rear end which passes through the web of the channel and attaches the bracket to the outer side of the web. The bracket is in the form of a flat bar, the flat side of which is attached against the side face of the web. I also provide means, preferably a hook-bolt, passing through the bar and having a hook engaging one of the flanges (preferably the lower flange) of the frame bar. The bar which forms the bracket is provided with a combined bend and twist which is disposed over the forward end of the frame, and forward of this combined bend and twist the bracket is formed into a spring bow preferably of substantially U shape, and the forward extension of this bow carries the usual horizontal bumper bar.

Referring to the drawings, 1 represents the forward end of the right hand side bar of the automobile frame, and this bar may be of the usual channel form having a vertical web 2, an upper flange 3 and a lower flange 4. At its forward end this frame bar is connected to the forward end of a spring 5 by a shackle joint 6 which may include a grease cup 7.

My bracket 8 is preferably constructed of strap iron or steel, that is to say, it is in the form of a flat bar. Adjacent the rear end of this flat bar an opening is provided to receive a bolt such as a snubber bolt 9 of the automobile. In order to support the forward portion of the bracket, I provide a hook bolt or J-bolt 10 which passes through the bar 8, and the hook 11 of this bolt hooks over one of the flanges of the frame bar 1.

In the present instance I prefer to have the rear portion of the bracket inclined downwardly in a forward direction, so that its lower edge extends below the lower edge of the frame bar, enabling me to place the hook bolt 11 so that it engages the lower flange 4. Forwardly of this point I provide the bracket 8 with a combined bend and twist 12, that is to say, I provide a curve or bight 13 with a twist in it just over the joint connection 6. In this way I produce a rudimentary recess under the bight 13 which conforms somewhat to the shape of the connection 6 and by reason of the existence of the combined bend and twist, the flat face 14ᵃ of the inclined extension 14 of the bracket just forward of the connection is brought into a plane substantially parallel with the axis of the joint. Forward of this point the bracket is bent into the form of a downwardly located bow 15 preferably of substantially U-shape, located about on a level with the shackle joint 6, and the bracket terminates in an upward extension 16 which is provided with means such as a bolt 17 and hooked end 18 for securing the cross bar or bumper bar 19 in position.

It sometimes happens that the outer face of the web 2 will present projections such as bolt-heads or such as a rivet head 20. If any particular type of car presents such an obstruction on the outer side of the web, I provide an offset 21 in the bracket to receive this head. In this way, I accommodate the head of the projection without punching a hole through the bracket to receive the head. The inclined extension 14 of the bracket which is just forward of the joint 6 is disposed clear of the frame, and all parts of the joint, so that if the bumper bar 19 strikes anything in its path, the U portion of the bracket will not be moved against the frame. The combined bend and twist 12 is formed so that the middle plane of the U-shaped portion 15 substantially coincides with the middle plane of the rear portion of the bracket.

It is understood that the embodiment of the invention described herein is only one of the many embodiments this invention may take, and I do not wish to be limited in the practice of the invention, nor in the claims, to the particular embodiment set forth.

What I claim is:

1. In a bumper-bracket construction for automobiles, the combination of a side frame bar of channel form having a vertical web with an upper flange and a lower flange, a bracket with a bolt adjacent its rear end passing through the said web and attaching the bar to the outer side of the web, a hook-bolt passing through the bracket and having a hook engaging one of said flanges, said bar having a combined bend and twist disposed over the forward end of the frame and having a substantially U-shaped extension disposed forward of the said bend and twist, and means for attaching a bumper bar to the forward part of the said U-shaped extension.

2. In a bumper-bracket construction for automobiles, the combination of a side frame bar of channel form having a vertical web with an upper flange and a lower flange, a spring with a shackle joint connecting the same to the forward end of the frame bar, a bracket consisting of a substantially flat bar with a bolt adjacent its rear end passing through the bracket and the said web to attach the bracket to the outer side of the web, a hook-bolt passing through the bracket and having a hook engaging the said lower flange, operating to support the forward end of the bracket, said bracket having a combined bend and twist disposed over the said joint and having a substantially U-shaped extension disposed forward of the bend and twist, and means for attaching a bumper to the forward part of the said U-shaped extension.

3. In a bumper-bracket construction for automobiles, the combination of a side frame bar of channel form having a vertical web with an upper flange and a lower flange, a spring with a shackle joint connecting the same to the forward end of the frame bar, a bracket with a bolt adjacent its rear end passing through the bracket and the said web to attach the bracket to the outer side of the web, the lower edge of said bracket extending below the lower edge of said frame bar and having means for engaging a flange of the frame bar to secure the bracket thereto and operating to support the forward end of the bracket, said bracket extending forwardly over the said joint and having a substantially U-shaped extension disposed forward of the said joint and on a level with the same, and means for securing a bumper bar to the said U-shaped extension.

4. A bumper-bracket consisting of a flat bar having a bolt at its rear end for attaching the same to the side of an automobile frame, a hook-bolt carried by the bar for engagement with the flange of the automobile frame, said bar having a combined bend and twist disposed toward its forward portion and having a substantially U-shaped extension at its forward end beyond the said combined bend and twist, said U-shaped extension having its bow disposed downwardly and having means for securing a bumper bar thereto.

5. A bumper-bracket consisting of a bar having means for securing the same to the automobile frame, and having a combined bend and twist disposed toward its forward portion forming a relatively large bight on its underside and having a substantially U-shaped extension at its forward end beyond the said combined bend and twist, said U-shaped extension having its bow disposed downwardly and having means for securing a bumper bar thereto.

6. In a bumper-bracket construction for automobiles, the combination of a side frame bar, a spring with a shackle joint connecting the same to the forward end of the frame bar, the bracket consisting of a substantially flat bar with means adjacent its rear end for securing the same to the side frame bar, said bracket having other means for securing the same to the frame bar, and having a combined bend and twist forming a bight on its underside lying over the said shackle joint, and having a substantially U-shaped extension disposed forward of the shackle joint and about on a level with the same.

Signed at Los Angeles, California, this 9th day of March, 1925.

JOSEPH C. GRIFFIN.